(12) United States Patent
Mashimo et al.

(10) Patent No.: US 7,721,126 B2
(45) Date of Patent: May 18, 2010

(54) COMMUNICATION APPARATUS AND METHOD WITH PHYSICAL ADDRESS FILTER FOR POWER-SAVING CONTROL STATE

(75) Inventors: Hiroshi Mashimo, Tokyo (JP);
Kazutoshi Hara, Kawasaki (JP);
Masanori Nakahara, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 11/354,815

(22) Filed: Feb. 16, 2006

(65) Prior Publication Data

US 2006/0212732 A1 Sep. 21, 2006

(30) Foreign Application Priority Data

Mar. 15, 2005 (JP) ............................ 2005-073957

(51) Int. Cl.
*G06F 1/26* (2006.01)
(52) U.S. Cl. ..................................... 713/320; 358/1.15
(58) Field of Classification Search ................. 713/320; 358/1.15
See application file for complete search history.

(56) References Cited

U.S. PATENT DOCUMENTS

| 5,541,657 | A | 7/1996 | Yamamoto et al. ........... 348/388 |
| 6,498,625 | B1 | 12/2002 | Yamamoto et al. ........ 348/384.1 |
| 7,133,374 | B2 * | 11/2006 | Lo et al. ...................... 370/318 |
| 7,257,095 | B2 * | 8/2007 | Liu ............................. 370/311 |
| 7,379,992 | B2 * | 5/2008 | Tung ........................... 709/223 |
| 2003/0033423 | A1 | 2/2003 | Okabe et al. |
| 2003/0179725 | A1 | 9/2003 | Lo et al. |
| 2005/0216776 | A1 * | 9/2005 | Watanabe .................... 713/300 |
| 2005/0219120 | A1 * | 10/2005 | Chang .................... 342/357.13 |
| 2006/0203833 | A1 | 9/2006 | Hara et al. .................. 370/401 |

FOREIGN PATENT DOCUMENTS

| CN | 1369178 A | 9/2002 |
| CN | 1402477 A | 3/2003 |
| JP | 2003-18306 A | 1/2003 |
| JP | 2003-526226 | 9/2003 |
| JP | 2003-348095 | 12/2003 |
| JP | 2004-07187 A | 1/2004 |
| JP | 2004-120213 | 4/2004 |
| JP | 2004-120213 A | 4/2004 |
| WO | 99/35778 | 7/1999 |
| WO | 00/78071 A1 | 12/2000 |

OTHER PUBLICATIONS

Office Action in corresponding Chinese Application No. 2006-10059807.8, dated Nov. 7, 2008.
Japanese Office Action dated May 7, 2009 in related Japanese Patent Application No. 2005-073957.
Japanese Office Action dated Jan. 6, 2010 in corresponding Japanese Application No. 2005-073957.

* cited by examiner

*Primary Examiner*—Albert Wang
(74) *Attorney, Agent, or Firm*—Fitzpatrick, Cella, Harper & Scinto (57) ABSTRACT

In a communication apparatus for wirelessly communicating directly with a communication apparatus that is participating in a network, a filter is set so as to receive only a signal from a communicating party before start of a power-saving control function at the time of standby, the set filter is removed after the power-saving control function for standby is terminated, and a logical address on the network is reset. As a result, when the power-saving control function is utilized, collision of physical addresses is prevented and it is possible to perform data communication without mismatch.

12 Claims, 11 Drawing Sheets

COMMUNICATION APPARATUS AND METHOD WITH PHYSICAL ADDRESS FILTER FOR POWER-SAVING CONTROL STATE

FIELD OF THE INVENTION

This invention relates to a communication apparatus, as well as a method of controlling same, having a power saving function.

BACKGROUND OF THE INVENTION

A wireless communication apparatus is equipped with means for suppressing consumption of operating power at standby, namely a power-saving control function, in order to reduce power consumption. This power-saving control function will be described in brief. First, a receive frame is divided into two periods, namely a first period and a second period. In the first period, a notification signal indicating whether there is distribution of data to each of a number of terminals is transmitted. In the second period, reception power is maintained as usual if there is data the destination of which is the local apparatus, and reception power is lowered if receive data is accepted and there is no data the destination of which is the local apparatus.

By thus dividing processing for receiving a signal notifying of data distribution and actual data, needless reception power can be reduced.

In accordance with the IEEE 802.11 standard, there is a power management function for suppressing amount of terminal battery consumption as the above-mentioned power-saving control function. With regard to utilization of a terminal power-saving mode, application to an infrastructure mode possessing a base station is clearly determined by specifications.

However, in an adhoc network in which terminals communicate with each other directly by sharing a network identifier without the intermediary of a specific base station, either a function for recognizing the power-saving state of a terminal participating in the network does not exist or recognition cannot be performed accurately. As a result, if the power-saving mode is utilized, there are problems such as instances where data cannot be received normally.

Consequently, if a terminal A activates the power-saving mode at the time of standby and data addressed to terminal A is sent in a state in which reception power has been lowered, then the data cannot be received. In particular, if an IP-address confirmation packet (ARP Request) is sent and a response to this packet cannot be made, there is a possibility that another terminal will acquire the same IP address.

By way of example, if another terminal B happens to acquire the same IP address, then data directed to terminal B will be sent to terminal A and terminal A will process this data. Terminal A will thus receive unnecessary data and execute needless processing. Further, terminal B will respond to data directed to terminal A and normal communication may be lost.

SUMMARY OF THE INVENTION

Accordingly, an object of the present invention is to prevent collision of addresses and make possible data communication without mismatch when a power-saving control function is utilized.

According to the present invention, the foregoing object is attained by providing a communication apparatus comprising: a communication unit; and setting unit configured to perform a filter setting of a receive signal based upon an address of a communicating party if the communication unit has been placed in a power-saving control state.

Further, according to the present invention, the foregoing object is attained by providing a communication apparatus comprising: setting unit configured to set a filter in such a manner that a signal from a communicating party is received if a power-saving control function at the time of standby has started; and resetting unit configured to remove the filter that has been set by the setting unit and resetting an address on a network after the power-saving control function at the time of standby is terminated.

Further, according to the present invention, the foregoing object is attained by providing a method of controlling a communication apparatus comprising: a first setting step of setting a communication unit in power-saving control state; and a second setting step of setting a filter setting of a receive signal based upon an address of a communicating party in accordance with the setting at the first setting step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will now be described in detail with reference to the drawings.

This embodiment will be described taking as an example a case where a printer serving as an output unit establishes an adhoc network that is compliant with IEEE 802.11, and a digital camera (referred to simply as a "camera" below) serving as an image sensing device participates in the network and operates in a power-saving (PS) mode, which is a power-saving control function.

Figure 1:
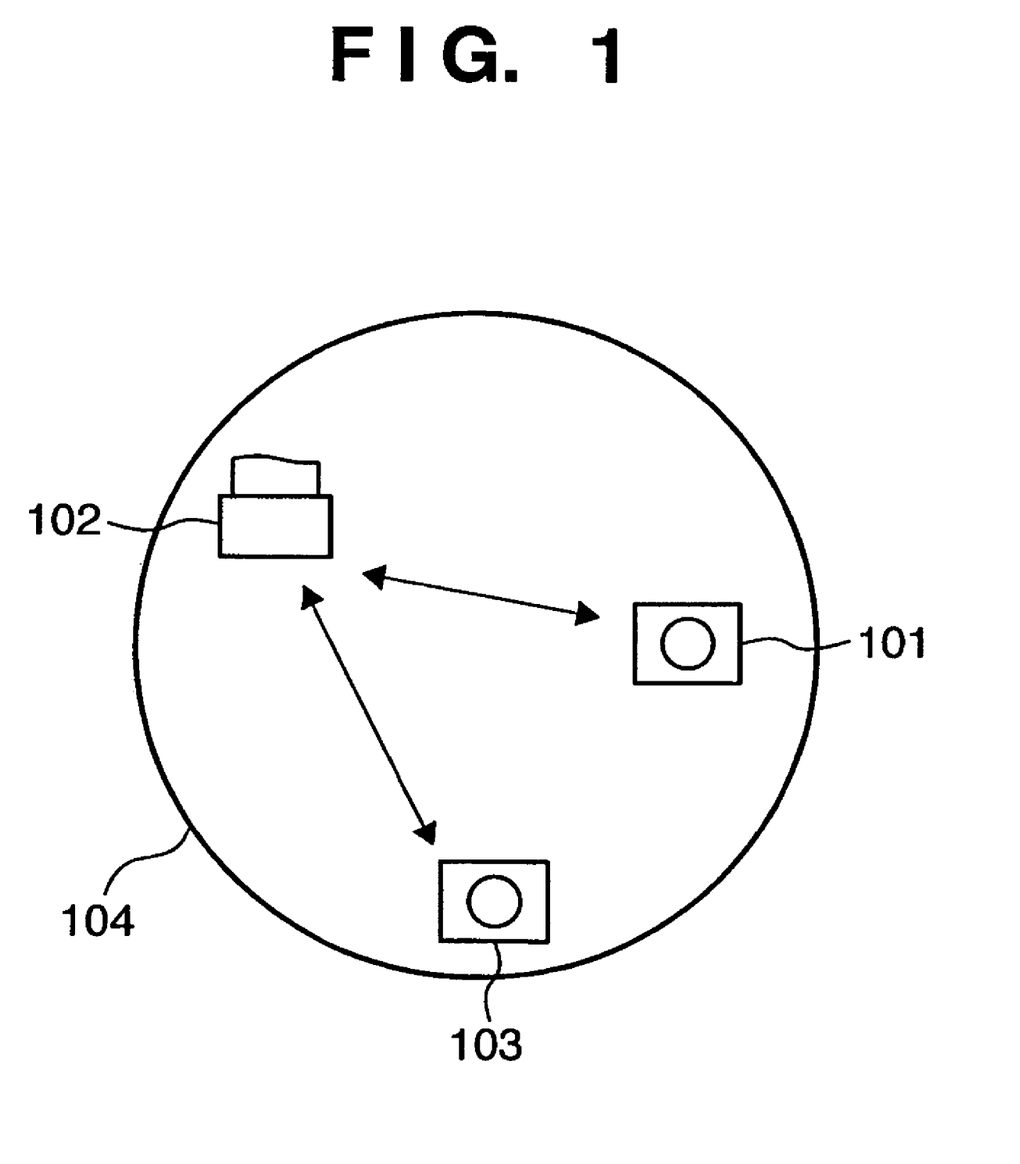
FIG. 1 is a diagram illustrating an example of the configuration of a network system according to an embodiment of the present invention.

FIG. 1 is a diagram illustrating an example of the configuration of a network system according to an embodiment of the present invention. The example shown in FIG. 1 is the configuration of a network 104 comprising a camera 101 prior to start of the power-saving mode, a printer 102 and a camera 103. The network 104 is an adhoc network and enables direct communication between terminals without the intervention of a specific base station.

In this embodiment, the object is to transmit data from camera 101 or 103 to the printer 102 in the power-saving (PS) mode.

Figure 2:
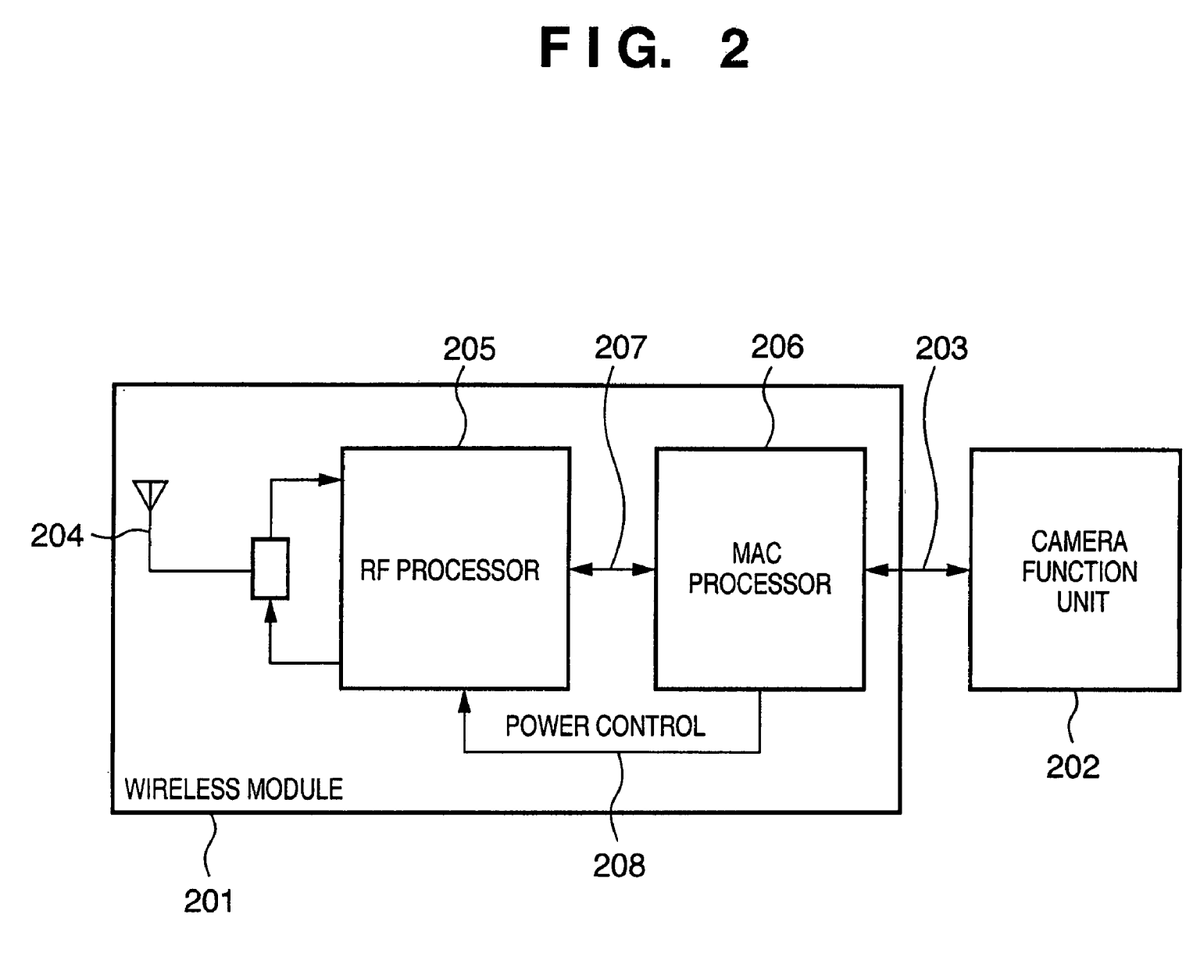
FIG. 2 is a block diagram illustrating an example of the structure of a camera according to this embodiment.

The structures of the camera 101 and printer 102 constituting the network shown in FIG. 1 will be described with reference to FIGS. 2 and 3, respectively. FIG. 2 is a block diagram illustrating an example of the structure of a camera according to this embodiment, and FIG. 3 is a block diagram illustrating an example of the structure of a printer according to this embodiment.

As illustrated in FIG. 2, the camera 101 (103) is divided broadly into a wireless module 201 and a camera function unit 202. The camera function unit 202 has a camera image-sensing function, a TCP/IP data processing function, a function for controlling the wireless module 201 and a data communication function. Control of the wireless module 201 is performed utilizing a memory interface 203 such as an interface for a Compact Flash (registered trademark) memory.

The wireless module 201 has a function for controlling the camera function unit 202 and a data communication function. The function is a MAC (Medium Access Control)/PHY (Physical Layer) function, which is a wireless LAN function compliant with IEEE 802.11 (referred to as the "802.11 standard" below). The wireless module 201 is subdivided into an antenna 204, an RF processor 205 and a MAC processor 206. The MAC processor 206 has a MAC/PHY function in a wireless LAN compliant with the 802.11 standard, a control and data communication function with regard to the camera function unit 202, and a function for controlling the RF processor 205. Control of the RF processor 205 implemented by the MAC processor 206 is carried out via an interface 208 for power control and an interface 207 for receive processing. Control of packet transmission power is performed by a power control interface 208. The RF processor 205, which possesses a PHY function compliant with the 802.11 standard, sends and receives data via an antenna 204.

Figure 3:
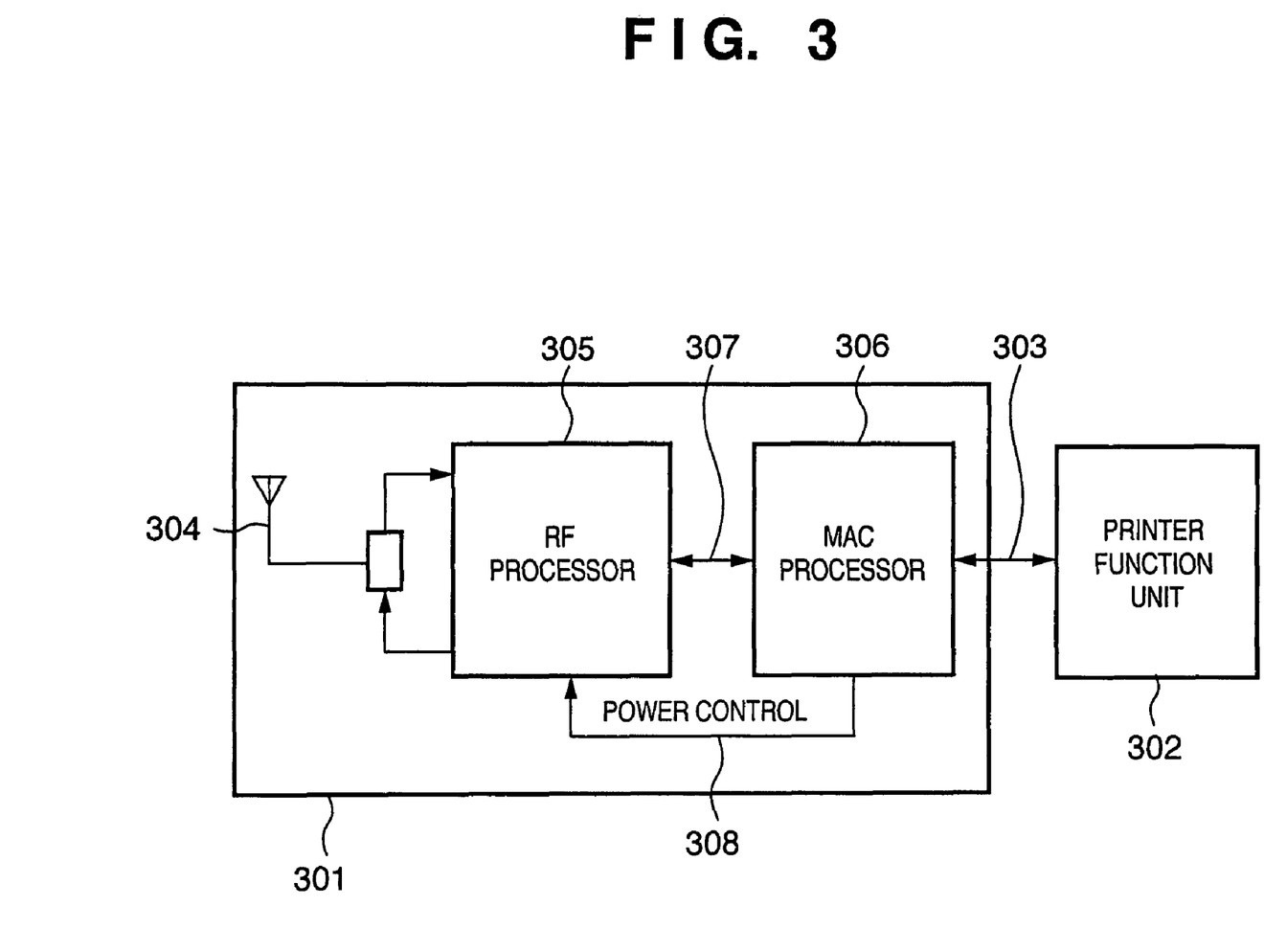
FIG. 3 is a block diagram illustrating an example of the structure of a printer according to this embodiment.

As shown in FIG. 3, the printer 102 is divided broadly into a wireless module 301 and a printer function unit 302. The printer function unit 302 has a printing function, a TCP/IP data processing function, a function for controlling the wireless module 301 and a data communication function. The structure of the wireless module 301 is identical with that of the wireless module 201 of camera 101 and need not be described again.

In a case where the camera 101 participates in the network 104 in FIG. 1, the camera function unit 202 shown in FIG. 2 sends the wireless module 201 a command to participate in the network, a radio signal in compliance with the 802.11 standard is transmitted by the MAC processor 206 and RF processor 205 and a network is formed.

The state shown in FIG. 1 is a state in which the cameras 101 and 103 are both communicating with the printer 102 in the active mode. Processing through which the camera 101 starts the power-saving mode with the printer 102 and processing in a case where the printer 102 has received a power-saving mode start request from the camera 101 will be described. First, processing through which the power-saving mode is started in the camera 101 will be described with reference to FIG. 4.

Figure 4:
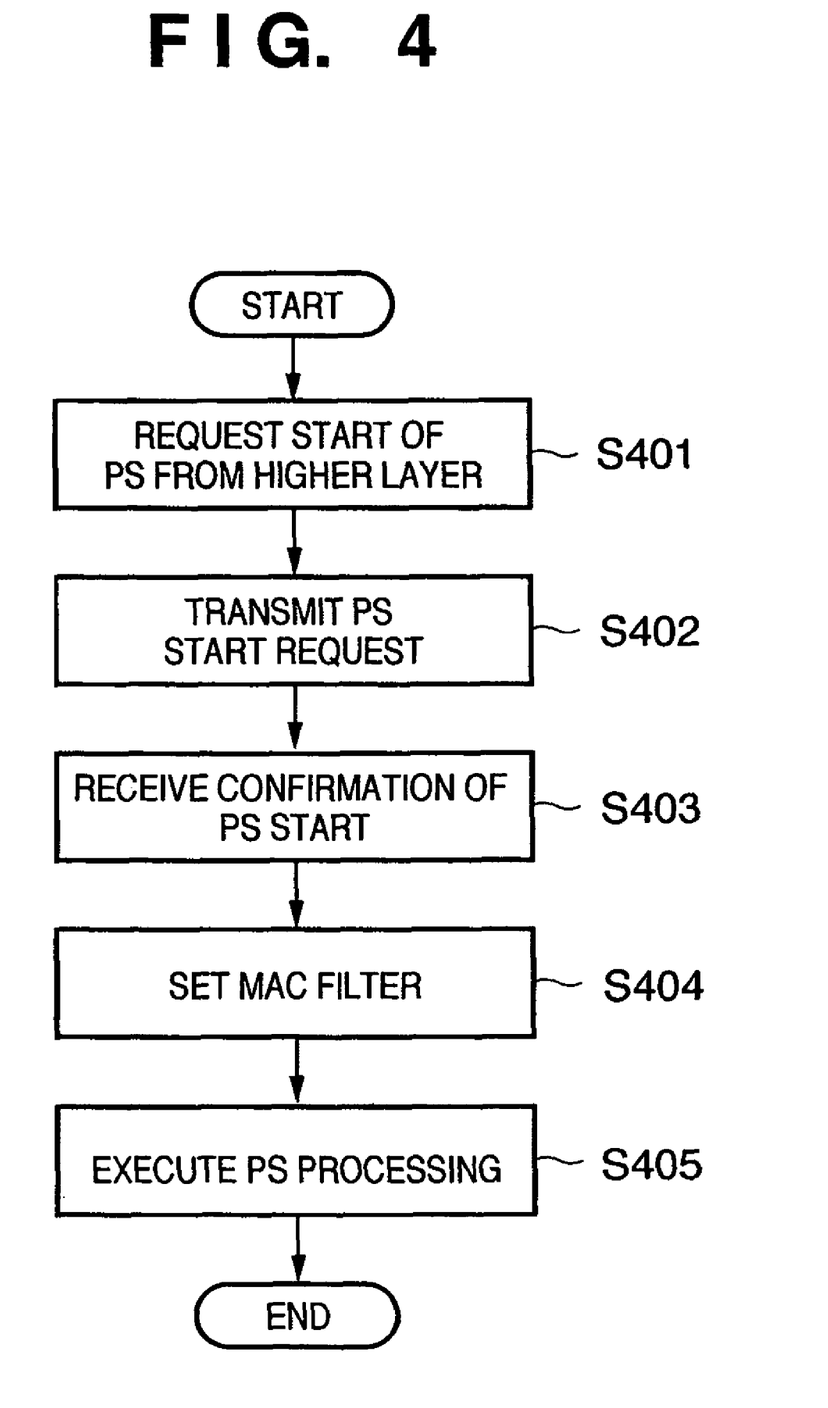
FIG. 4 is a flowchart illustrating processing to start a power-saving mode on the side of a camera.

FIG. 4 is a flowchart illustrating processing to start the power-saving mode on the camera side. First, at step S401, if the camera 101 receives a power-saving mode start request from a higher layer, control proceeds to step S402. Here the camera 101 transmits the power-saving mode start request to the printer 102, which is the communicating party. In response, the printer 102 sends the camera 101 confirmation of start of the power-saving mode.

When the camera 101 thenceforth receives confirmation of start of the power-saving mode from the printer 102 at step S403, control proceeds to step S404. Here the camera 101 sets a filter that discards all with the exception of the MAC address of the printer 102. More specifically, this is carried out by having the camera function unit 202 of camera 101 shown in FIG. 2 send the wireless module 201 a command to set a MAC file. Upon receiving the setting command, the MAC processor 206 executes filter processing in such a manner that only a packet the transmission source of which is the MAC address of the printer 102 that is the communicating party is transmitted to the camera function unit 202; packets other than this packet are discarded.

It should be noted that the above-described processing is executed with regard to unicast and multicast in data frames and is not applied to management frames and control frames.

Next, at step S405, the camera 101 executes processing to start the power-saving mode for making a transition between an awake state and a snooze state systematically. More specifically, this is processing whereby the camera function unit 202 of the camera 101 sends the wireless module 201 a PS command to implement the power-saving function and the MAC processor 206 lowers the current of the prediction signal 204 intermittently.

Figure 5:
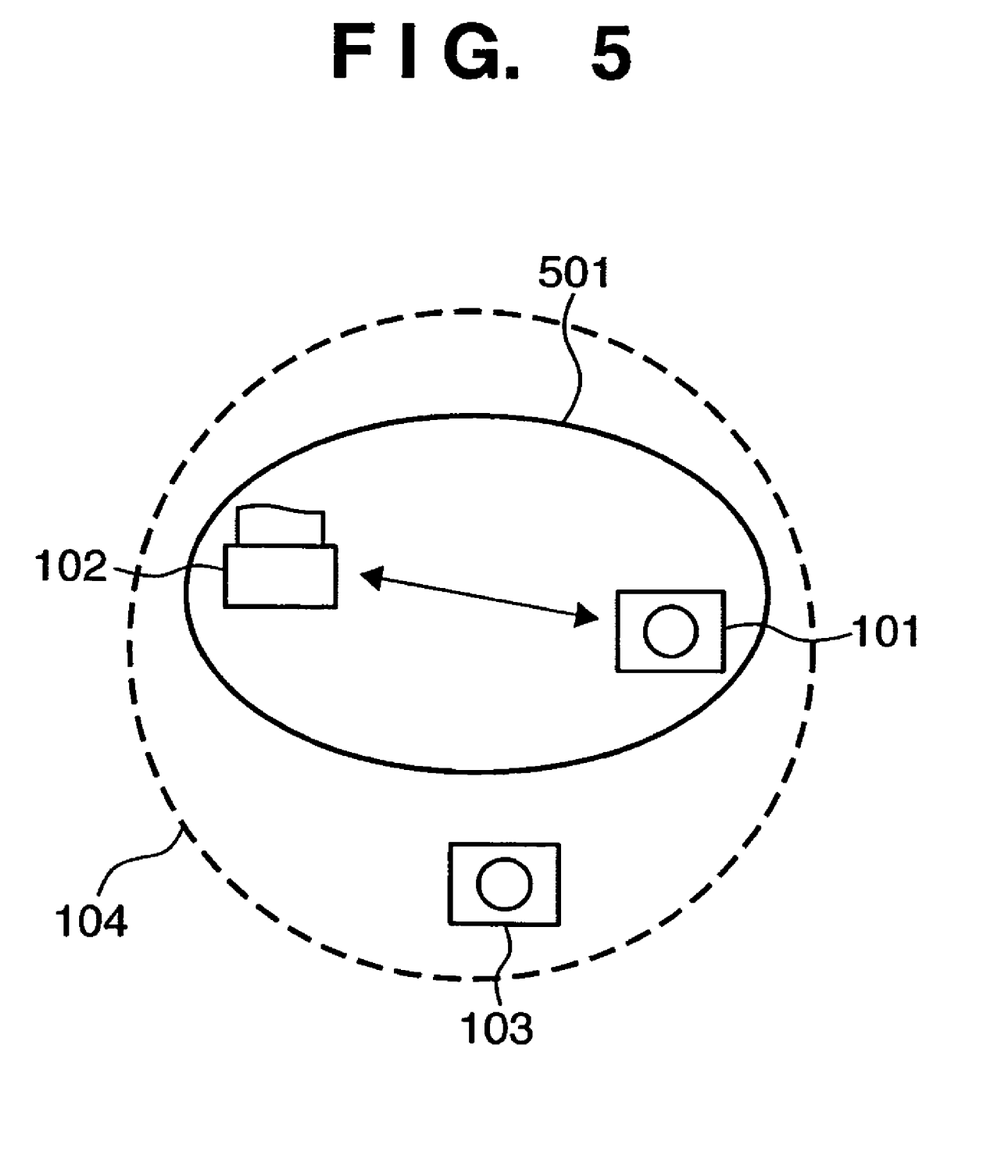
FIG. 5 is a diagram illustrating a network formed by a camera 101 and a printer 102.

As a result, a network 501 separate from the network 104 of FIG. 1 is formed by the camera 101 and printer 102, as illustrated in FIG. 5.

Figure 6:
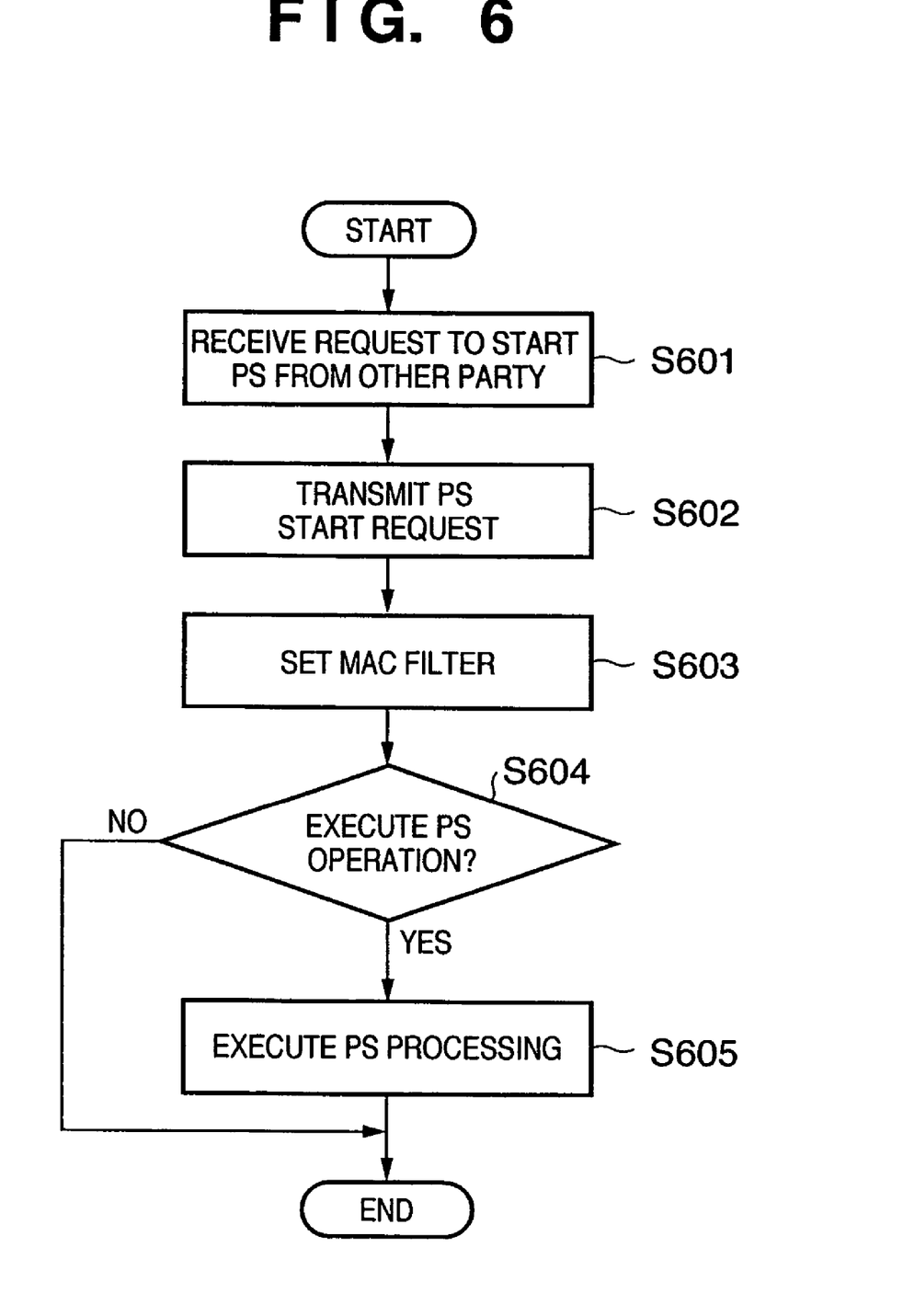
FIG. 6 is a flowchart illustrating processing on the side of a printer in a case where a request to start a power-saving mode has been received from a camera.

Next, reference will be had to FIG. 6 to describe processing in the printer 2 in a case where the request to start the power-saving mode has been received from the camera 101.

FIG. 6 is a flowchart illustrating processing on the printer side in a case where a request to start the power-saving mode has been received from the camera. First, at step S601, if the printer 102 receives a request to start the power-saving mode from a communicating party (camera 101), control proceeds to step S602 and the printer 102 sends the camera 101 confirmation of start of the power-saving mode.

Next, at step S603, the printer 102 sets a filter that discards all with the exception of the MAC address of the communicating party (camera 101) that issued the power-saving mode start request. More specifically, this is carried out by having the printer function unit 302 of printer 102 shown in FIG. 3 send the wireless module 301 a command to set a MAC file. It should be noted that the processing by a MAC processor 306 of the wireless module 301 is similar to that executed by the MAC processor 206 of the camera 101.

Next, the printer 102 determines whether to implement the power-saving mode at step S604. It should be noted that since the printer 102 is being supplied with enough power from a power-supply outlet, it is unnecessary for the printer 102 to activate the power-saving control function. Consequently, a "NO" decision is rendered at step S604, the power-saving mode is not implemented and processing is exited as is. The state shown in FIG. 5 is attained, the printer 102 communicates in the active mode as is, and the camera 101 transitions to the power-saving mode and communicates. If it is determined at step S604 that the power-saving mode is to be executed, then the printer 102 transitions to the power-saving mode at step S605 and communicates.

It should be noted that in the network 501 shown in FIG. 5, the filters have been set so as to discard packets other than both MAC addresses. Consequently, the camera 101 receives only data from the printer 102 and the printer 102 receives only data from the camera 101. This means that data frames of terminals other than these are no longer received.

Figure 7:
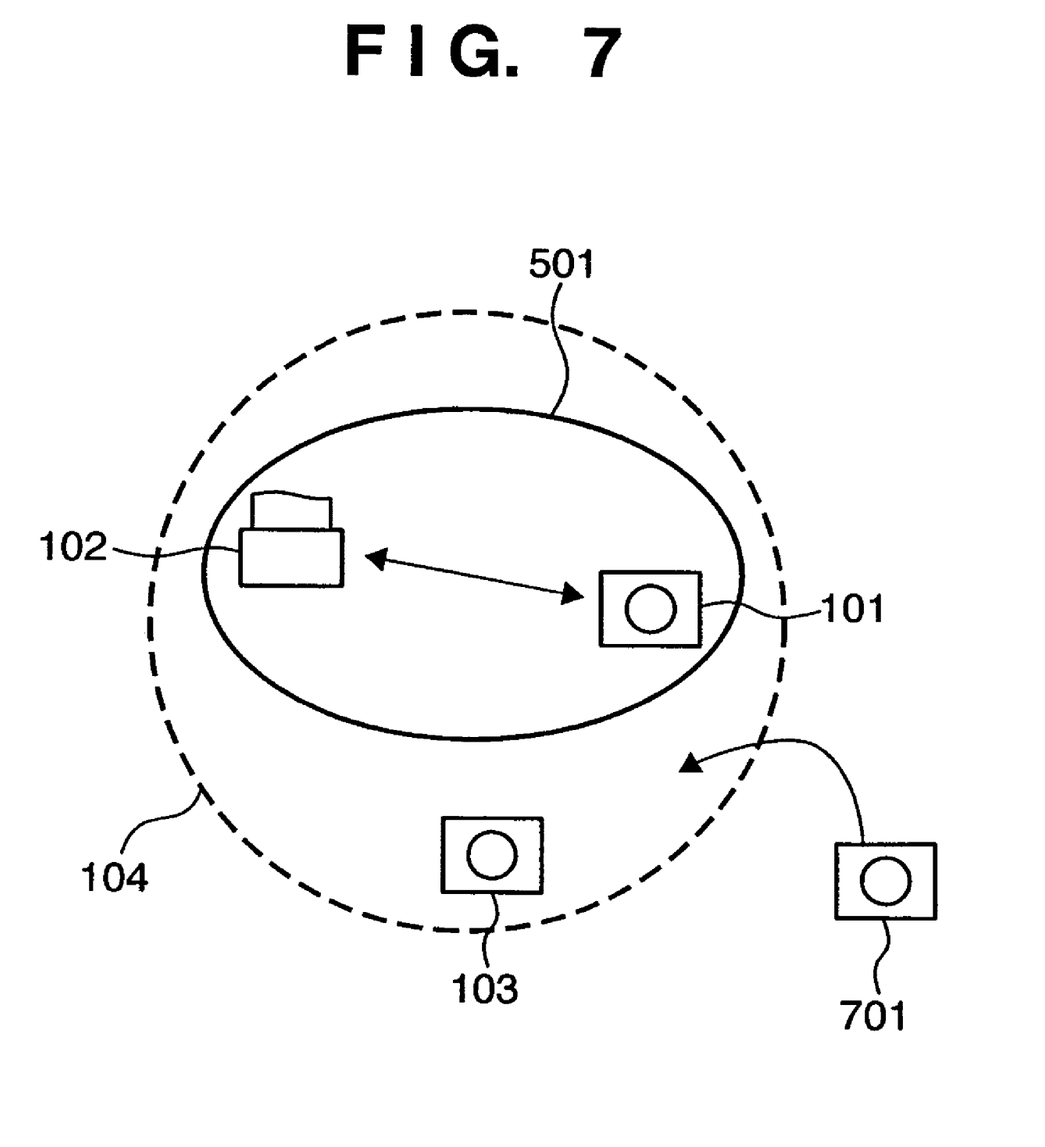
FIG. 7 is a diagram illustrating a state in which a camera 701 has entered a network 104 anew while the camera 101 is communicating with the printer 102 and is implementing a power-saving control function.

Described next will be a case where a camera 701 has entered the network 104 anew while the camera 101 is communicating with the printer 102 and is implementing the power-saving control function.

First, the camera 701 broadcasts an ARP request message to the network 104 in order to verify that a terminal having an IP address identical with that of the camera 701 does not exist. Here it is assumed that the IP address that has been assigned to the camera 701 is identical with that of camera 101. The ARP request from the camera 701 is transmitted as a multicast data frame. This frame is received by the RF processor 205 and by an RF processor 305 of the camera 101 and printer 102, respectively.

Even through the camera 701 has the same IP address as that of the camera 101, the MAC processor 206 and MAC processor 306 of the camera 101 and printer 102, respectively, discard frames other than those of the camera 101 and printer 102 by the MAC filters and hence no data mismatch occurs.

Figure 8:
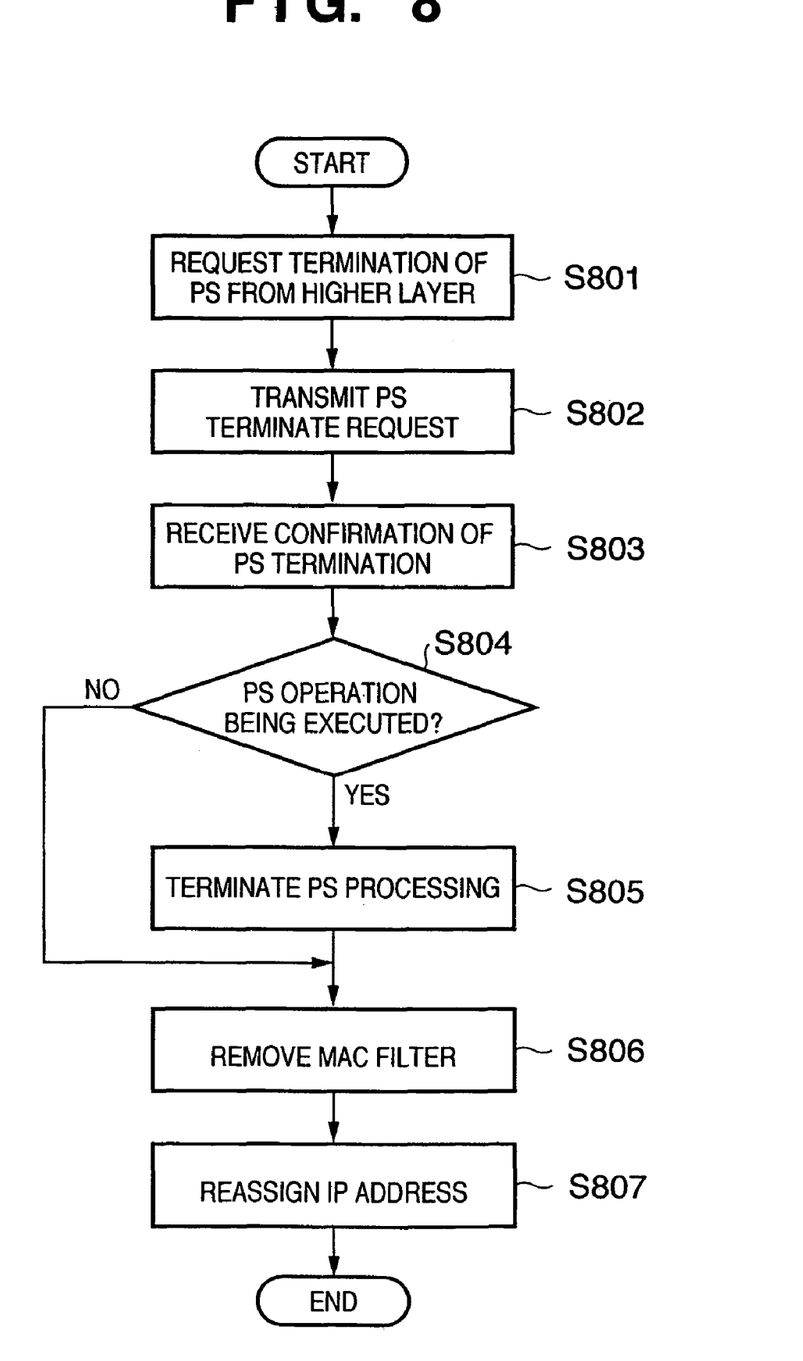
FIG. 8 is a flowchart illustrating processing for terminating a power-saving mode on the side of a camera.

Next, reference will be had to FIG. 8 to describe processing through which a transition is made from the power-saving mode to the active mode in accordance with a command from the printer 102 while the camera 101 communicates with the printer 102 in the power-saving mode.

FIG. 8 is a flowchart illustrating processing for terminating a power-saving mode on the camera side. First, when the camera 101 receives a request to terminate the power-saving mode from the higher layer at step S801, control proceeds to step S802. Here the camera 101 transmits the power-saving terminate request to the printer 102, which is the communicating party. In response, the printer 102 sends the camera 101 confirmation of termination of the power-saving mode.

When the camera 101 thenceforth receives confirmation of termination of the power-saving mode from the printer 102, control proceeds to step S804. Here the camera 101 determines whether the power-saving mode is active or not. If the power-saving mode is active, then control proceeds to step S805 and processing to terminate the power-saving mode is executed. More specifically, the camera function unit 202 sends the wireless module 201 a command to terminate the power-saving mode, and the MAC processor 206 exercises control in such a manner that the current of the RF processor 205 continues flowing.

Next, processing for removing the MAC filter is executed at step S806. More specifically, the camera function unit 202 sends the wireless module 201 a command to remove the MAC filter, and the MAC processor 206 removes the MAC filter that discards all with the exception of the MAC address of the printer 102. As a result, a frame that has been received from the network 104 is capable of being processed.

Next, at step S807, the IP address is reassigned in the camera function unit 202. More specifically, the IP address is changed and it is verified by an ARP request message whether the same IP address exists on the network. If a terminal having the same IP address does not exist, this IP address is utilized as a new IP address. If a terminal having the same IP address exists, then the IP address is changed again. This changing of the IP address is repeated until a terminal having the same IP address no longer exists.

Figure 9:
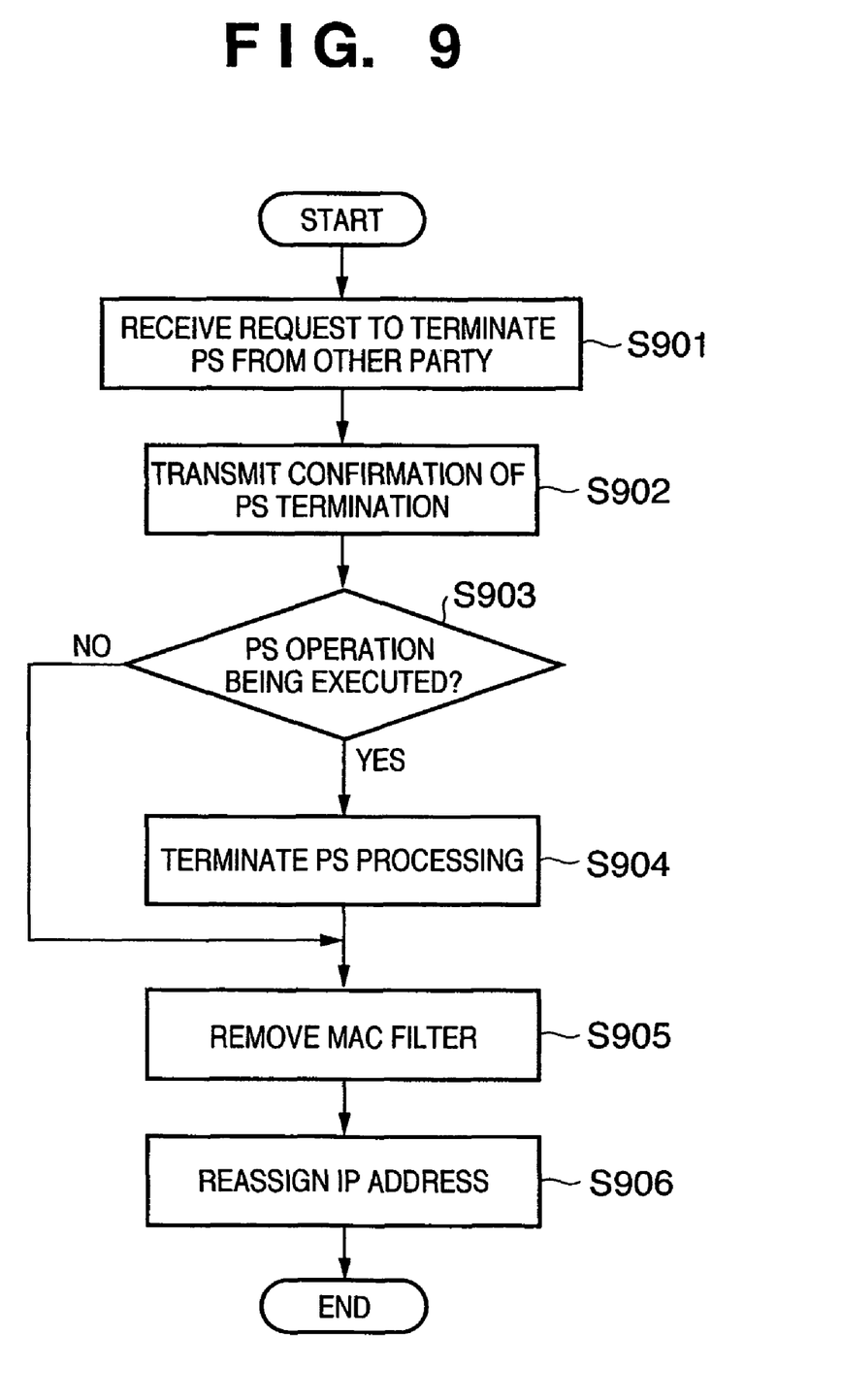
FIG. 9 is a flowchart illustrating processing on the side of a printer in a case where a request to terminate a power-saving mode has been received from a camera.

Next, reference will be had to FIG. 9 to describe processing in the printer 102 in a case where the printer 102 has received the request to terminate the power-saving mode from the camera 101.

FIG. 9 is a flowchart illustrating processing on the printer side in a case where a request to terminate the power-saving mode has been received from the camera. First, at step S901, if the printer 102 receives a request to terminate the power-saving mode from a communicating party (camera 101), control proceeds to step S902 and the printer 102 sends the camera 101 confirmation of termination of the power-saving mode.

It is subsequently determined at step S903 whether operation in the power-saving mode is in progress. If operation in the power-saving mode is in progress, control proceeds to step S904, where the printer 102 executes processing to terminate the power-saving mode. More specifically, the printer function unit 302 sends the wireless module 301 a command to terminate the power-saving mode and the MAC processor 306 exercises control in such a manner that the current of the RF processor 305 continues flowing.

Next, processing for removing the MAC filter is executed at step S905. More specifically, the printer function unit 302 sends the wireless module 301 a command to remove the MAC filter, and the MAC processor 306 removes the MAC filter that discards all with the exception of the MAC address of the printer 102. As a result, a frame that has been received from the network 104 is capable of being processed.

Next, at step S906, the IP address is reassigned in the printer function unit 302. This processing is similar to that executed by the camera function unit 202 and need not be described again.

Figure 10:
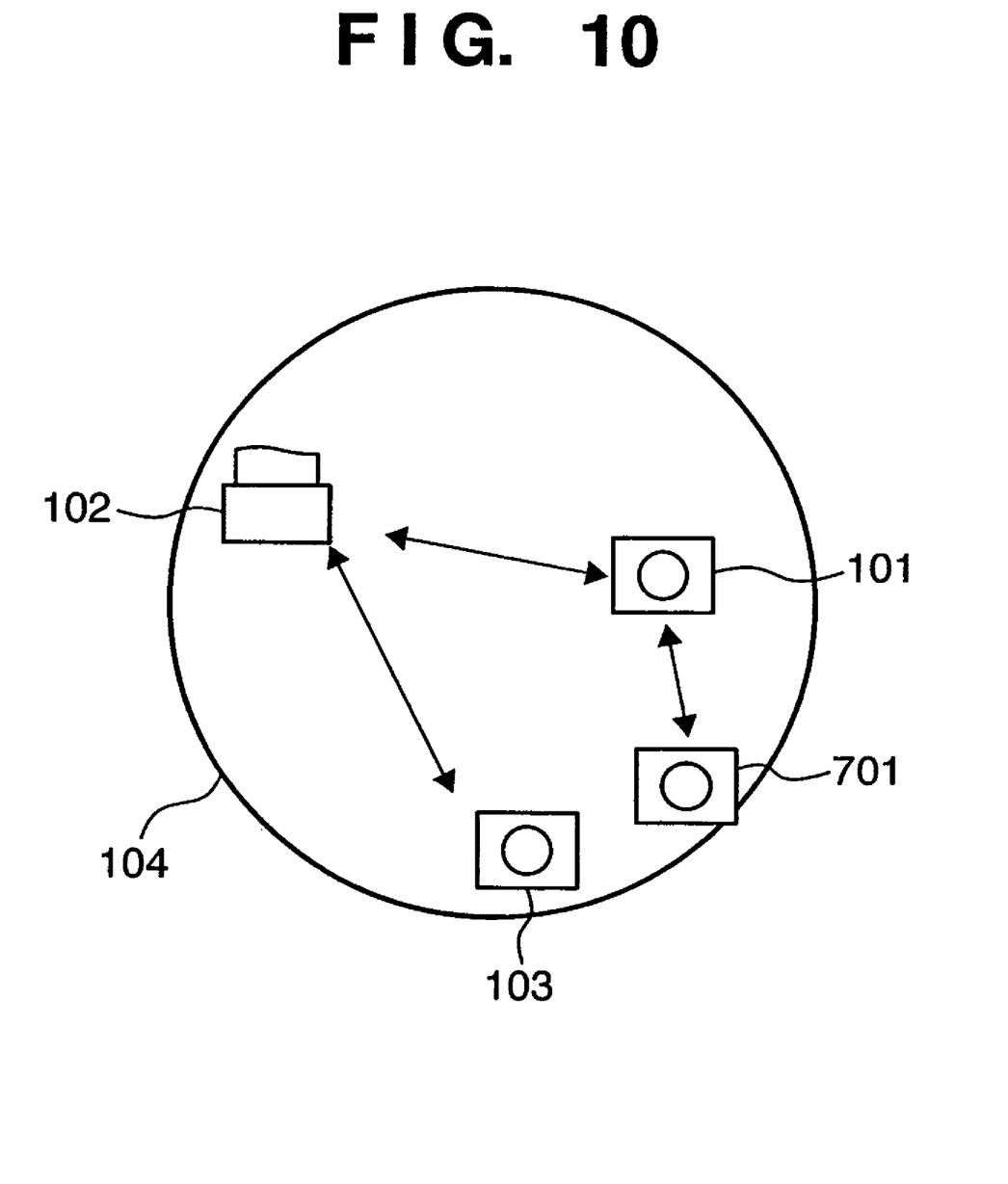
FIG. 10 is a diagram illustrating data communication with the camera 701 that is participating in the network 104 a new.

As a result, as shown in FIG. 10, the camera 101, printer 102 and camera 701 participate in the same network 104. However, since the camera 101 and printer 102 have already performed reassignment of IP address, there is no collision of IP address with that of the camera 701 that has come to participate in the network 104 during operation in the power-saving mode and data communication without mismatching of data can be performed.

Next, reference will be had to FIG. 11 to describe a sequence in which the above-mentioned camera 101 starts the power-saving mode between itself and the printer 102, performs data communication in the power-saving mode and subsequently terminates the power-saving mode.

Here a case where the printer 102 has already established an adhoc network and the camera 101 participates in the adhoc network and performs data communication in the power-saving mode will be described as an example. Further, with regard to the saving of power in the adhoc network, a well-known ATIM (Announcement Traffic Indication Message) is used. A description of this is omitted here.

Figure 11:
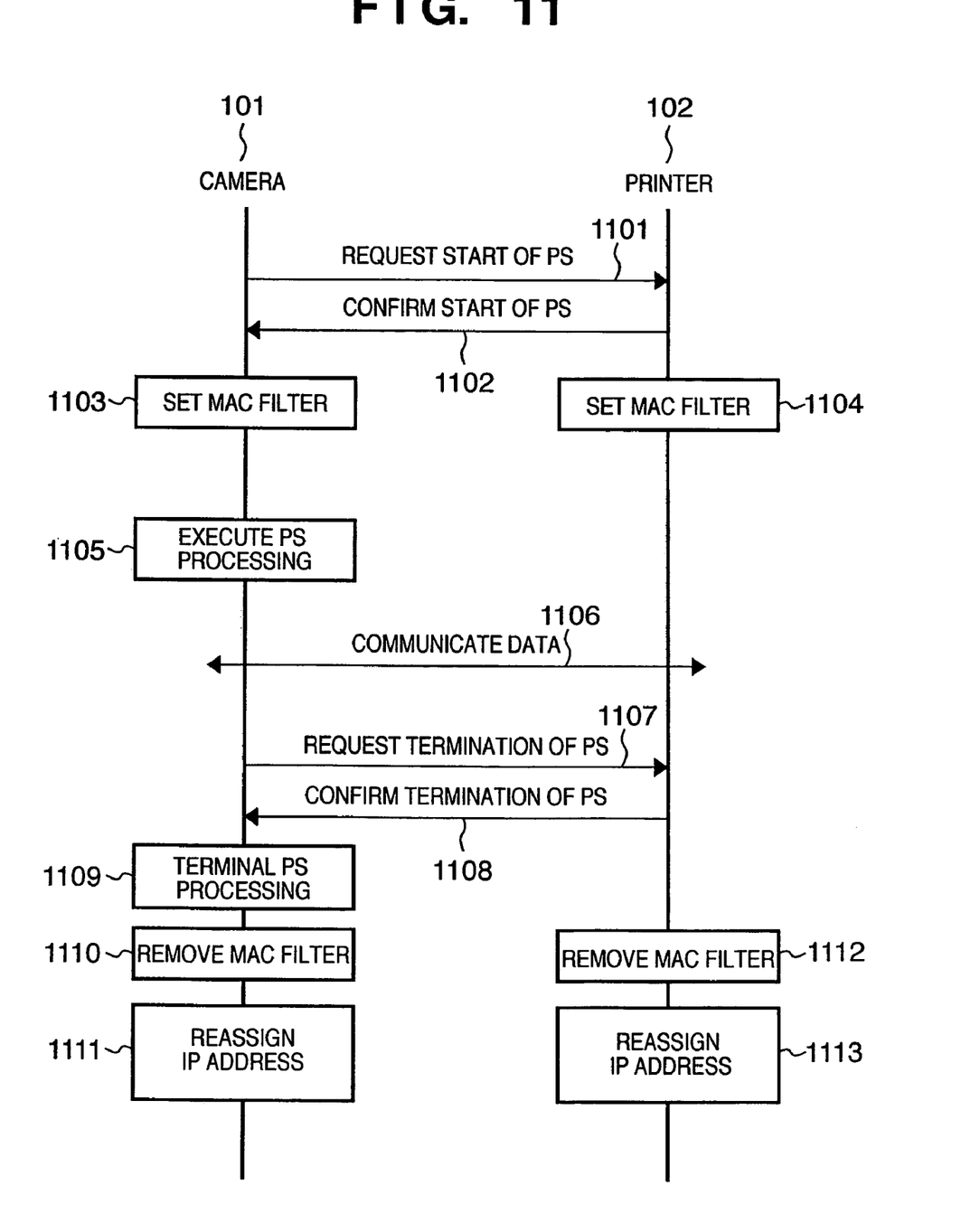
FIG. 11 is a diagram illustrating a sequence from start to termination of a power-saving mode according to this embodiment.

FIG. 11 is a diagram illustrating a sequence from start to termination of the power-saving mode according to this embodiment. If a request 1101 to start the power-saving mode is transmitted from the camera 101 to the printer 102, confirmation 1102 of start of the power-saving mode is transmitted from the printer 102 to the camera 101 in response. Accordingly, MAC-filter setting processing 1103, 1104 is executed by the camera 101 and printer 102, respectively.

The camera 101 subsequently executes processing 1105 for transitioning to the power-saving mode and data communication 1106 with the printer 102 is started. This data communication 1106 is transfer of a file of image data, which has been acquired by the camera 101, to the printer 102.

When this data communication ends, a request 1107 to terminate the power-saving mode is transmitted from the camera 101 to the printer 102. In response, confirmation 1108 of end of the power-saving mode is transmitted from the printer 102 to the camera 101. The camera 101 responds by executing processing 1109 for terminating the power-saving mode and then transitions to the active mode.

Processing 1110, 1112 for removing the MAC filters and IP-address reassignment processing 1111, 1113 is executed by the camera 101 and printer 102, respectively.

In accordance with the embodiment described above, collision of IP addresses is prevented and data communication without mismatch can be assured when a power-saving control mode is utilized in an adhoc network in which terminals communicate with each other directly without the intermediary of a specific base station.

Further, since a MAC filter utilizes an existing address in execution of communication, it is unnecessary to decide a procedure for change of a key on both sides as in the manner an encryption key is changed, and mounting is facilitated.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes read from the recording medium implement the novel functions of the embodiment and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiment are implemented by executing the program codes read by a computer, it goes without saying that the present invention covers a case where an operating system or the like running on the computer performs a part of or the entire actual process in accordance with the designation of program codes and implements the functions according to the embodiment by such processing.

It goes without saying that the present invention further covers a case where, after the program codes read from the recording medium are written in a memory provided on a function expansion board inserted into the computer or provided in a function expansion unit connected to the computer, a CPU or the like contained in the function expansion board or function expansion unit performs a part of or the entire actual process in accordance with the designation of program codes and implements the functions of the above embodiments by such processing.

In accordance with the present invention, mismatch in data communication when a power-saving control function is utilized can be prevented. For example, by performing a filter setting based upon the address of a communicating party, mismatch in data communication can be prevented even if logical addresses collide.

Further, in a case where the above-mentioned filter setting is removed, collision of logical addresses in a state in which the filter setting has not been made can be prevented by resetting a logical address, and it is possible to perform data communication without mismatch.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-073957, filed Mar. 15, 2005, which is hereby incorporated by reference herein in its entirety.

What is claimed is:

1. A communication apparatus comprising:
   a communication unit;
   a setting unit configured to set a physical address filter into the communication apparatus so as to receive a signal from a specified communicating party if said communication unit is placed in a power-saving control state; and
   a termination unit configured to terminate the power-saving control state based upon a request signal from the specified communicating party filtered by the physical address filter set by said setting unit.

2. The apparatus according to claim 1, further comprising a resetting unit configured to cancel the filter and to reset a logical address on a network if the power-saving control state of said communication unit is terminated.

3. The apparatus according to claim 2, wherein the logical address is an IP address assigned to a communication device on the network.

4. The apparatus according to claim 1, wherein said setting unit uses a physical address of the communicating party and sets the physical address filter that discards signals other than that of the physical address of the communicating party.

5. The apparatus according to claim 4, wherein said setting unit sets the physical address filter so as to receive a data frame which has the physical address of the communicating party, a management frame and a control frame.

6. The apparatus according to claim 5, wherein the physical address is a MAC address stipulated by a wireless LAN.

7. A communication apparatus in which a logical address of the communication apparatus on a network is assigned, comprising:
   a power-saving control unit configured to activate a power-saving control function of a communication unit;
   a setting unit configured to set a physical address filter into the communication unit in such a manner that a signal from a specified communicating party is received if the power-saving control function is activated at a time of standby;
   a cancellation unit configured to cancel the physical address filter if the power-saving control function is deactivated; and
   a reassigning unit configured to reassign the logical address such that the logical address of the communication apparatus is unique on the network, in response to cancellation of the physical address filter by said cancellation unit.

8. The apparatus according to claim 7, wherein the logical address is an IP address assigned to a communication device on the network.

9. A method of controlling a communication apparatus comprising:
   a first setting step of setting a communication unit in a power-saving control state;
   a second setting step of setting a physical address filter into the communication apparatus so as to receive a signal from a specified communicating party if the communication unit is placed in the power-saving control state; and a termination step of terminating the power-saving control state based upon a request signal from the specified communicating party filtered by the physical address filter set in the second setting step.

10. A computer-readable recording medium on which is stored a computer-executable program for causing a computer to execute a method of controlling a communication apparatus, the method comprising:

a first setting step of setting a communication unit in a power-saving control state;

a second setting step of setting a physical address filter into the communication apparatus so as to receive a signal from a specified communication party if the communication unit is placed in the power-saving control state; and a termination step of terminating the power-saving control state based upon a request signal from the specified communication party filtered by the physical address filter set in the second setting step.

11. A method of controlling a communication apparatus in which a logical address of the communication apparatus on a network is assigned, comprising:

a power-saving control step of activating a power-saving control function of a communication unit;

a setting step of setting a physical address filter into the communication unit in such a manner that a signal from a specified communicating party is received if the power-saving control function is activated at a time of standby;

a cancellation step of canceling the physical address filter if the power-saving control function is deactivated; and a reassigning step of reassigning the logical address such that the logical address of the communication apparatus is unique on the network, in response to cancellation of the physical address filter in the cancellation step.

12. A computer-readable recording medium on which is stored a computer-executable program for causing a computer to execute a method of controlling a communication apparatus in which a logical address of the communication apparatus on a network is assigned, the method comprising:

a power-saving control step of activating a power-saving control function of a communication unit;

a setting step of setting a physical address filter into the communication unit in such a manner that a signal from a specified communicating party is received if the power-saving control function is activated at a time of standby;

a cancellation step of canceling the physical address filter if the power-saving control function is deactivated; and a reassigning step of reassigning the logical address such that the logical address of the communication apparatus is unique on the network, in response to cancellation of the physical address filter in the cancellation step.

* * * * *